(12) United States Patent
Sekiguchi et al.

(10) Patent No.: US 9,630,790 B2
(45) Date of Patent: Apr. 25, 2017

(54) COUPLING DEVICE, SHEET CONVEYANCE DEVICE, AND DRIVING FORCE TRANSMITTING DEVICE

(71) Applicant: CANON KABUSHIKI KAISHA, Tokyo (JP)

(72) Inventors: Hajime Sekiguchi, Abiko (JP); Tomohito Nakagawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/504,236

(22) Filed: Oct. 1, 2014

(65) Prior Publication Data

US 2015/0097334 A1    Apr. 9, 2015

(30) Foreign Application Priority Data

Oct. 4, 2013    (JP) .................. 2013-209381

(51) Int. Cl.
| | |
|---|---|
| *B65H 3/06* | (2006.01) |
| *B65H 5/06* | (2006.01) |
| *B65H 27/00* | (2006.01) |
| *B65H 3/52* | (2006.01) |
| *F16D 1/116* | (2006.01) |

(52) U.S. Cl.
CPC ............ *B65H 5/06* (2013.01); *B65H 3/0638* (2013.01); *B65H 27/00* (2013.01); *B65H 3/0669* (2013.01); *B65H 3/5261* (2013.01); *B65H 2402/5152* (2013.01); *B65H 2404/134* (2013.01); *F16D 1/116* (2013.01); *Y10T 403/58* (2015.01); *Y10T 403/7039* (2015.01)

(58) Field of Classification Search
CPC ............ B65H 3/0638; B65H 2402/515; B65H 2402/5151; B65H 2402/5152; B65H 2402/5153; B65H 2402/5155; B65H 2402/5521; B65H 2402/60; B65H 2402/63; B65H 2402/631; B65H 2402/64; F16B 21/06; F16B 21/065; F16B 21/08; F16B 21/16; Y10T 403/7039
See application file for complete search history.

(56) References Cited

U.S. PATENT DOCUMENTS

| | | | | |
|---|---|---|---|---|
| 5,181,715 A | * | 1/1993 | Ohkoda et al. | ................ 271/272 |
| 6,661,986 B2 | * | 12/2003 | Kitayama | ..................... 399/167 |
| 8,382,532 B2 | * | 2/2013 | Sjostedt | ............... H01R 13/187 |
| | | | | 439/817 |

FOREIGN PATENT DOCUMENTS

| | | | | |
|---|---|---|---|---|
| DE | 102010009467 A1 | * | 7/2011 | ............ B65H 51/10 |
| JP | 59187168 A | * | 10/1984 | ............ F16H 55/17 |
| JP | 06201020 A | * | 7/1994 | ............ F16H 55/17 |
| JP | 7-206208 A | | 8/1995 | |

OTHER PUBLICATIONS

Machine translation of DE 102010009467 A1, retrieved May 5, 2016.*

* cited by examiner

*Primary Examiner* — Michael McCullough
(74) *Attorney, Agent, or Firm* — Canon USA, Inc. I.P. Division

(57) ABSTRACT

This disclosure provides a coupling device configured to couple a shaft and a rotating member supported on the shaft so as to be rotatable and demountable from the shaft including a contacting portion provided on a rotating member, and a restricting member provided on the shaft so as to be rotatable and configured to restrict a movement of the rotating member in the axial direction by coming into contact with the contacting portion.

18 Claims, 6 Drawing Sheets

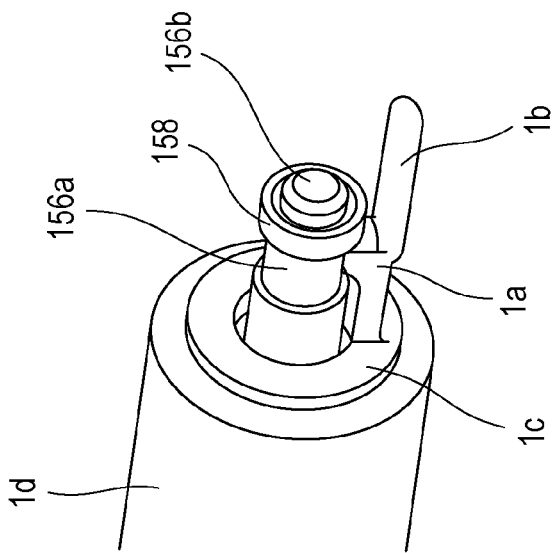
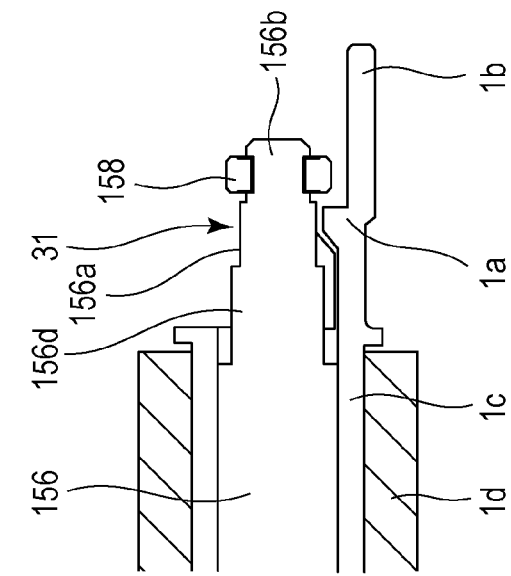

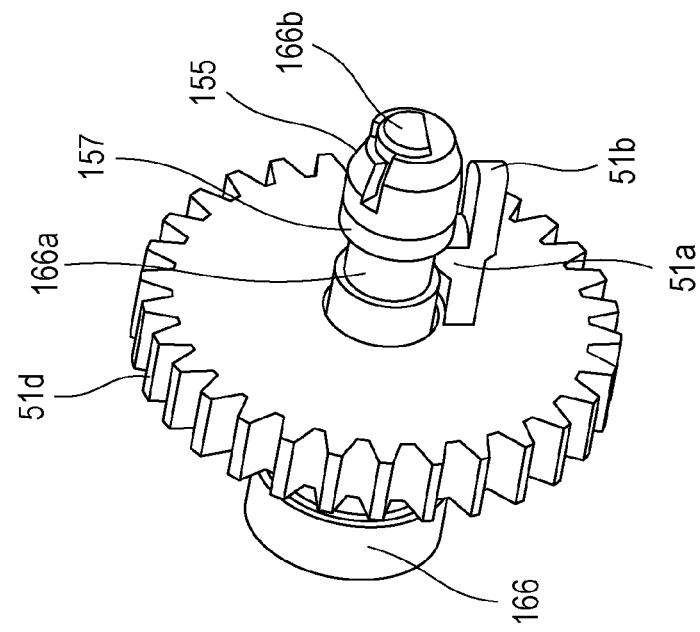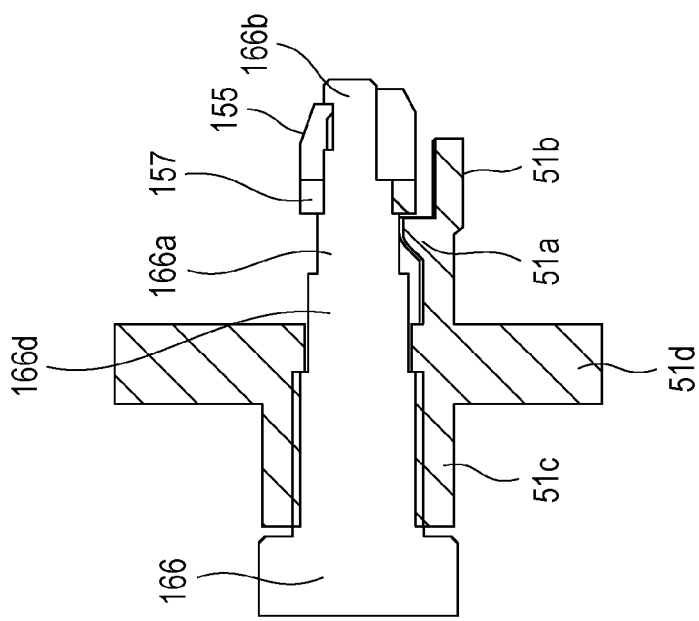

COUPLING DEVICE, SHEET CONVEYANCE DEVICE, AND DRIVING FORCE TRANSMITTING DEVICE

BACKGROUND

Field of the Invention

This disclosure relates to a coupling device configured to couple a shaft and a rotating member which can be demounted from the shaft.

Description of the Related Art

Image forming apparatuses such as printers, copying machines, facsimile machines of the related art include a sheet conveyance device configured to separate sheets set in a cassette one-by-one by using a roller and feed the separated sheets to an image forming unit. A roller configured to feed sheets needs to be replaced due to abrasion caused by a long-term use or adhesion of paper powder, and hence the roller is configured to be demountable from a roller shaft. A coupling device in which the roller demountably mounted on the roller shaft is coupled so as not to come off the roller shaft at the time of feeding the sheet is required. At the time of replacement of the roller, it is desired that the roller can be demounted from the shaft easily.

In a mechanism configured to transmit a rotational driving force by a gear as well, there is a case where the gear is replaced. In this case as well, a configuration in which the gear is prevented from coming off from the gear (rotating member), and the gear can be demounted from the shaft easily at the time of replacement of the gear is desired. As a locking device for locking the gear so as not to come off, a configuration in which a snap fit claw provided on a gear abuts against a wall surface of a grove provided on the shaft is proposed (Japanese Patent Laid-Open No. 7-206208). In other words, in this coupling device, the snap fit claw abuts against the wall surface of the groove portion on the shaft, so that the gear is prevented from coming off in an axial direction. In a configuration in which the snap fit claw abuts against the groove portion, removal from the shaft at the time of replacement of the rotating member (gear) by an operation of the snap fit claw.

However, in the case where the rotating members such as the gear and the roller do not rotate integrally with the shaft, that is, when the shaft and a rotating body rotate relatively with each other, the snap fit claw abuts against the wall surface of the groove portion on the shaft, and hence may be worn due to a long-term use. In recent years, durability of products is improved, so that the frequency of usage of the mechanism such as the gear and the rollers is significantly increased. Therefore, wear of the snap fit claw may cause a problem of lowering of a locking function of the rotating members such as the gear and the rollers, which may increase rattling between the rotating members and the shafts thereof or cause rotating member to come off the shaft.

SUMMARY

This disclosure provides a coupling device configured to couple a shaft and a rotating member supported on the shaft so as to be rotatable and demountable from the shaft including a contacting portion provided on a rotating member, and a restricting member provided on the shaft so as to be rotatable and configured to restrict a movement of the rotating member in the axial direction by coming into contact with the contacting portion.

Further features of the present invention will become apparent from the following description of exemplary embodiments with reference to the attached drawings.

BRIEF DESCRIPTION OF THE DRAWINGS

FIGS. 5A and 5B are explanatory drawings illustrating a second embodiment.

FIGS. 6A and 6B are explanatory drawings illustrating a third embodiment.

DESCRIPTION OF THE EMBODIMENTS

General Configuration of Image Forming Apparatus

Embodiments of this disclosure will be described in detail.

Figure 1:
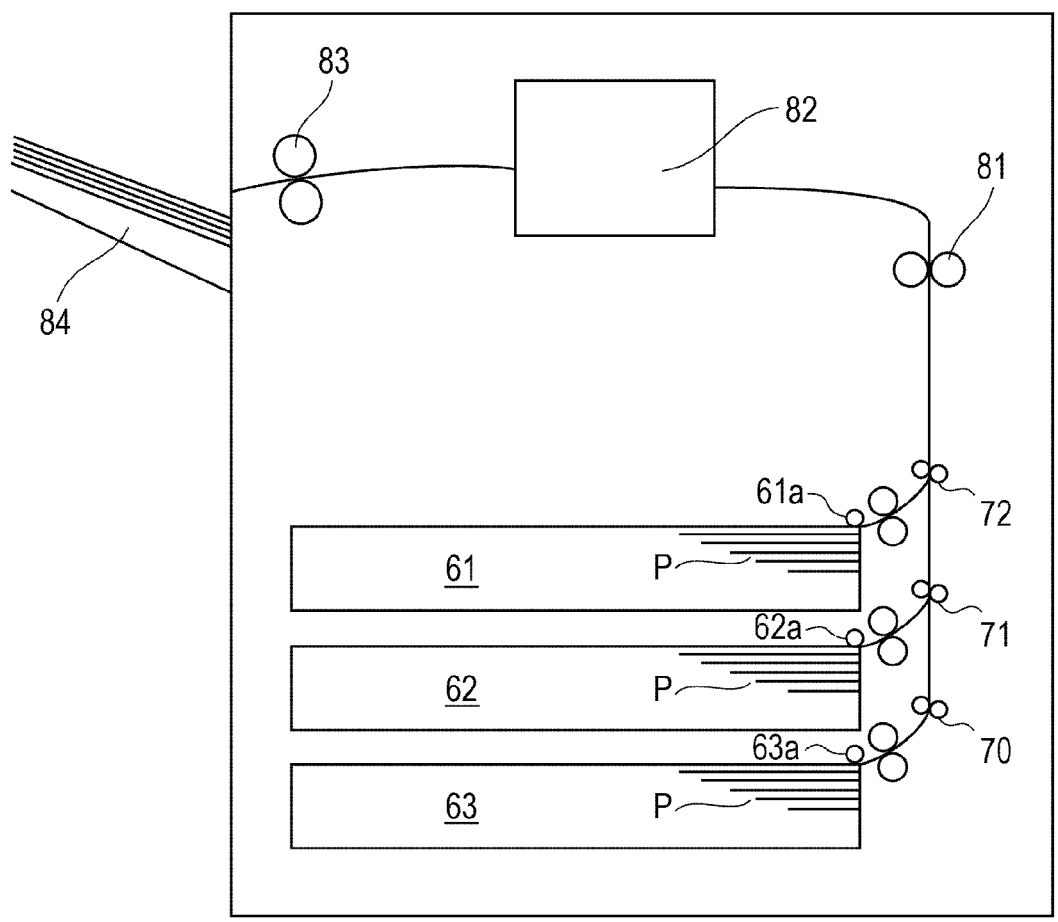
FIG. 1 is a drawing illustrating a configuration of an image forming apparatus provided with a retaining mechanism according to a first embodiment disclosed here.

FIG. 1 illustrates a schematic cross-sectional view of an image forming apparatus according to an embodiment of this disclosure.

Sheets of papers P are stacked in storages 61 to 63. The papers P stored in the storages 61 to 63 are fed by paper feed units 61a to 63a. Papers P fed by the paper feed unit 61a are conveyed by a pair of conveying rollers 72, papers P fed by a paper feed unit 62a are conveyed by pair of conveying rollers 71, and papers P fed by the paper feed unit 63a are conveyed upward by pair of conveying rollers 70.

Images are formed by an image forming unit 82 on the papers P fed from the paper feed units 61a to 63a being conveyed by a pair of conveying rollers 81. Each of the papers P on which the image is formed is discharged by a discharge roller 83 onto a discharge tray 84.

Subsequently, the paper feed units 61a to 63a as a sheet conveyance device will be described with reference to FIG. 2 to FIG. 4B. Since the three paper feed units 61a to 63a have the same configuration, the paper feed unit 61a will be described below.

Outline of Paper Feed Unit

Figure 2:
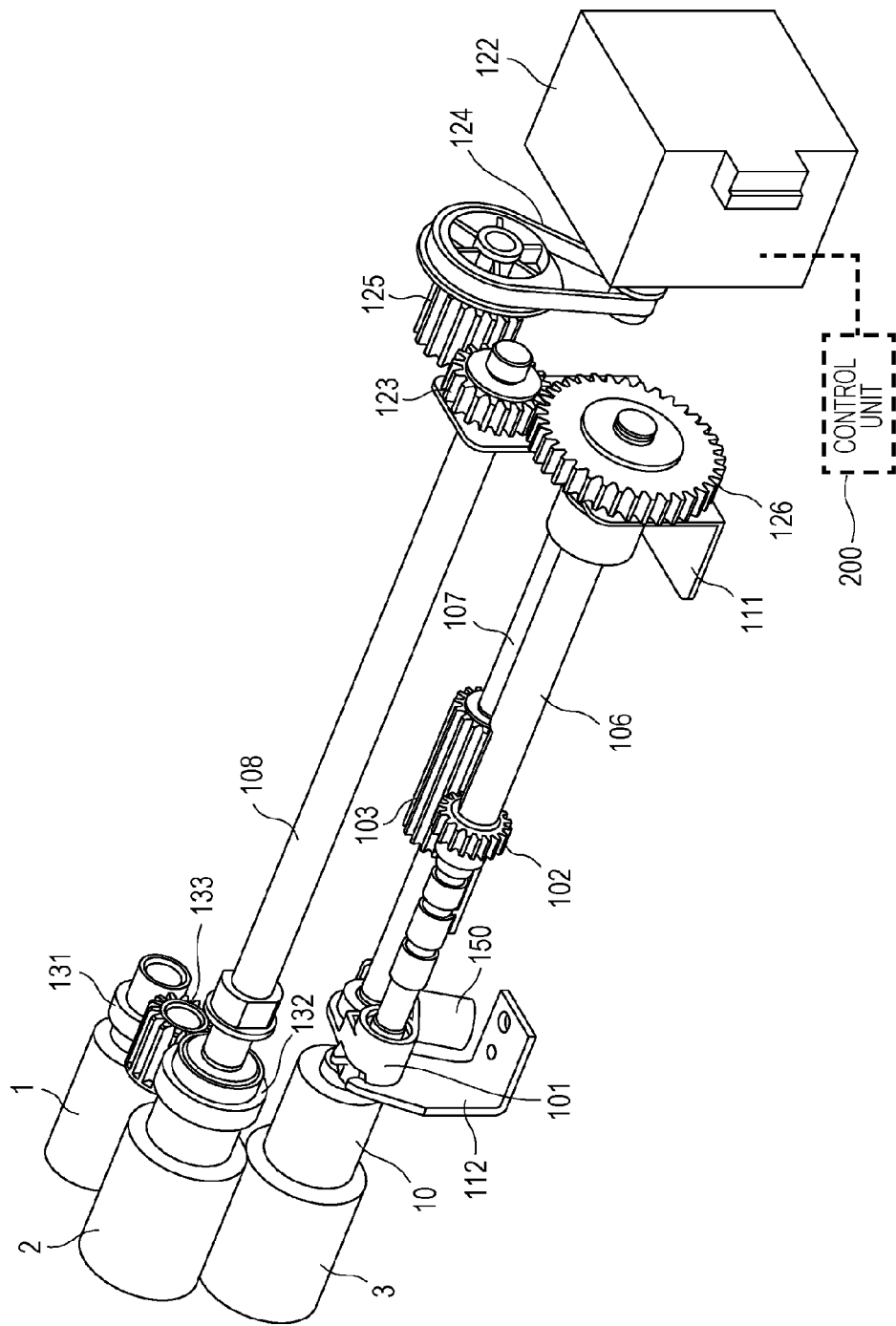
FIG. 2 is an explanatory drawing illustrating a configuration of the sheet conveyance device.

As illustrated in FIG. 2, the paper feed unit 61a includes a pick-up roller 1 disposed above the storage 61, a feed roller 2 configured to convey the papers P fed by the pick-up roller 1, and a retard roller 3 brought into press contact with the feed roller 2. The retard roller 3 comes into press contact with the feed roller 2, and constitutes a separating unit (press contact portion) configured to separate the papers P one by one in cooperation with the feed roller 2. The retard roller 3 is capable of being driven so as to follow the rotation of the feed roller 2.

Driving Force Transmission to Respective Rollers in Paper Feeding Unit

In FIG. 2, the pick-up roller 1, the feed roller 2, and the retard roller 3 are driven to rotate by a feed motor 122 controlled by a signal from a control unit 200.

In other words, a driving force of the feed motor 122 is transmitted to a pulley transmission gear 125 by a drive belt 124. A gear portion of the pulley transmission gear 125 engages a drive gear 123 which is provided on a feed roller shaft 108 and rotates integrally with the feed roller shaft 108.

The feed roller 2 is provided at an end of the feed roller shaft 108 via a one-way clutch so as to rotate in association with the rotation of the feed roller shaft 108. The driving force transmitted to the pulley transmission gear 125 is transmitted to the feed roller 2 via the drive gear 123 and the feed roller shaft 108, so that the feed roller 2 rotates.

A pick-up roller input gear 132 is fixed to the feed roller shaft 108, and a pick-up roller gear 131 is integrally provided on the pick-up roller 1. In a state in which the pick-up roller 1 is mounted on a pick-up roller shaft 156, the pick-up roller input gear 132 and the pick-up roller gear 131 of the feed roller shaft 108 are coupled via an idler gear 133. Therefore, the driving force of the rotation of the feed roller shaft 108 is transmitted from the pick-up roller input gear 132 to the pick-up roller gear 131 via the idler gear 133, whereby the pick-up roller 1 rotates.

The driving force of the feed motor 122 is transmitted to a drive gear 126 provided on the retard roller drive gear shaft 106 so as to rotate integrally with a retard roller drive gear shaft 106 via the drive gear 123. An adjusting drive gear 102 configured to rotate integrally with the retard roller drive gear shaft 106 is provided on the retard roller drive gear shaft 106. In addition, the adjusting drive gear 102 engages a retard roller drive gear 103 configured to rotate integrally with the retard roller shaft 107. The retard roller shaft 107 is rotated in a direction opposite to the direction of conveyance by the driving force transmitted from the adjusting drive gear 102. The retard roller 3 is mounted on the retard roller shaft 107 via a torque limiter 10, which is provided on the retard roller shaft 107. The retard roller drive gear shaft 106 is supported by the supporting plates 111 and 112 fixed to the frame of the apparatus main body so as to be rotatable. The retard roller shaft 107 is supported at an end portion of the arm 101 which pivots about a pivotal center of the retard roller drive gear shaft 106 so as to be rotatable. The retard roller 3 provided on the retard roller shaft 107 is brought into press contact with the feed roller 2 by a resilient force of a spring 150 which is configured to bias the arm 101 upward.

Action of Paper Feed Unit

When the pick-up roller 1 is rotated by a driving force transmitted from the feed motor 122, paper stored in the storage 61 is fed by the pick-up roller 1. The driving force from the feed motor 122 is transmitted also to the feed roller 2 and the retard roller 3. Only the topmost paper P is separated and fed by a press contact portion (separation nip portion) between the feed roller 2 and the retard roller 3.

As described above, the retard roller 3 is mounted so as to be rotated via the torque limiter 10 provided on the retard roller shaft 107.

When one piece of the papers P enters the separation nip portion between the retard roller 3 and the feed roller 2, since a load received from the piece of the papers P is increased, so that driving force transmission of the torque limiter 10 is disconnected, and the retard roller 3 is driven by the feed roller 2 via the papers P and rotates in a sheet conveying direction.

When a plurality of pieces of the papers P enters the separation nip portion, the load that the retard roller 3 receives is small, and hence the driving force transmission by the torque limiter 10 is not disconnected, whereby the retard roller 3 rotates in a reverse direction. By the rotation of the retard roller 3 in the reverse direction, a plurality of pieces of the papers P entering the separation nip portion are returned back toward the storage 61 from a paper on the retard roller 3 side in sequence, and only the single topmost paper is separated and conveyed. In this manner, with the rotation opposite to the sheet conveying direction exerted on the retard roller shaft 107, duplicated feeding of the papers P is prevented by the retard roller 3.

Configuration relating to Mounting and Demounting of Pick-Up Roller

Figure 3:
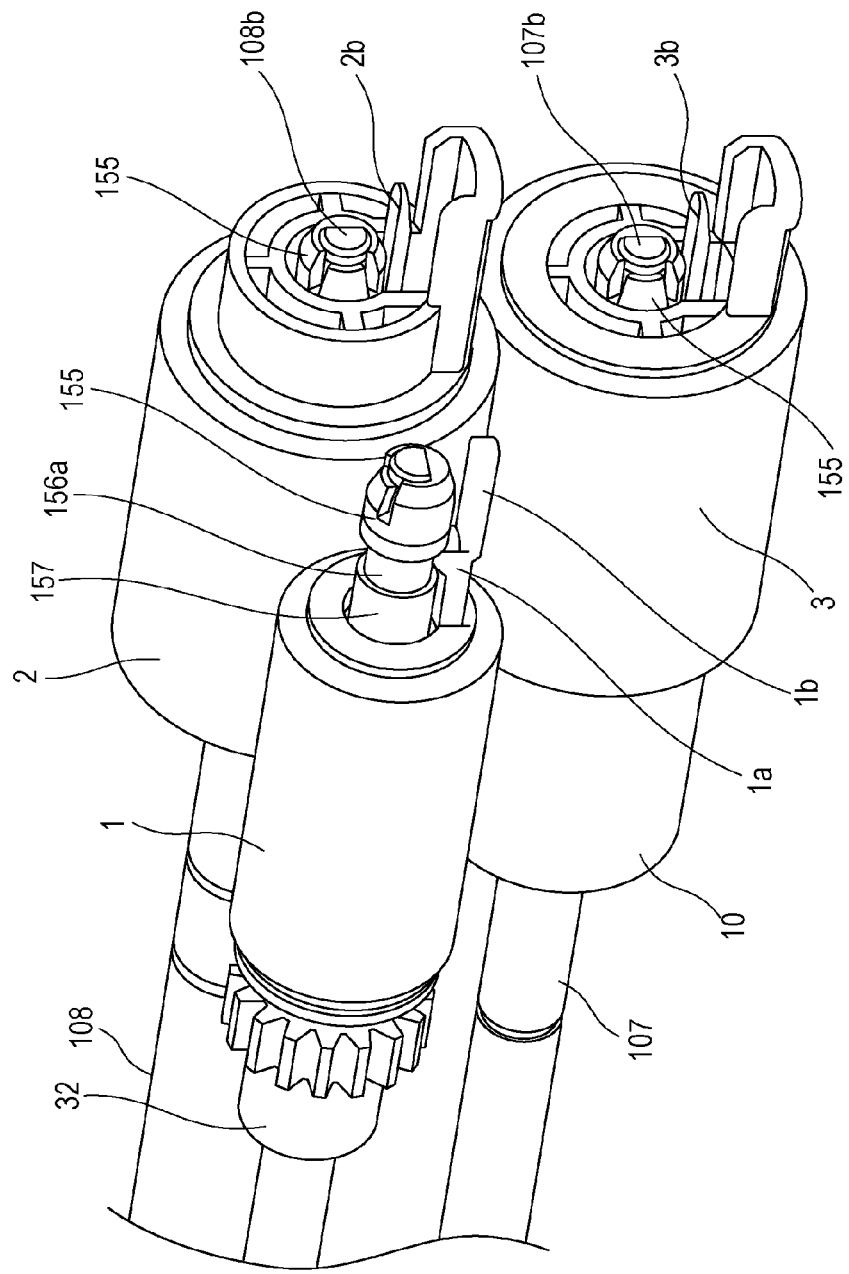
FIG. 3 is an explanatory drawing illustrating a feed roller, a retard roller, and a pick-up roller provided on the sheet conveyance device.
Figure 4A:
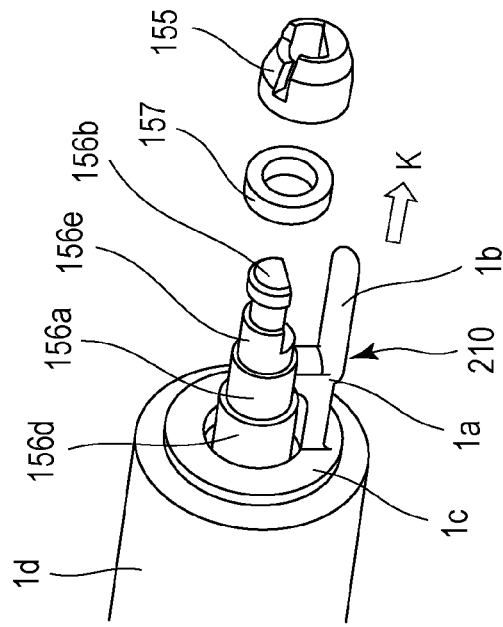
FIGS. 4A and 4B are explanatory drawings illustrating a roller retaining configuration.

FIG. 3 is a perspective view illustrating end portions of the pick-up roller 1, the feed roller 2, and the retard roller 3. FIG. 4A is an explanatory cross-sectional view and FIG. 4B is an assembly drawing for explaining the pick-up roller 1, the pick-up roller shaft 156, and a mechanism relating to coupling of the pick-up roller 1.

The pick-up roller 1 is demountably supported on the pick-up roller shaft 156. In this embodiment, one of the ends of the pick-up roller shaft 156 is fixed to a frame of the apparatus main body so that the pick-up roller shaft 156 does not rotate. Since the pick-up roller 1 rotates by the transmission of the driving force, the pick-up roller 1 and the pick-up roller shaft 156 rotates relatively with respect to each other.

Figure 4B:
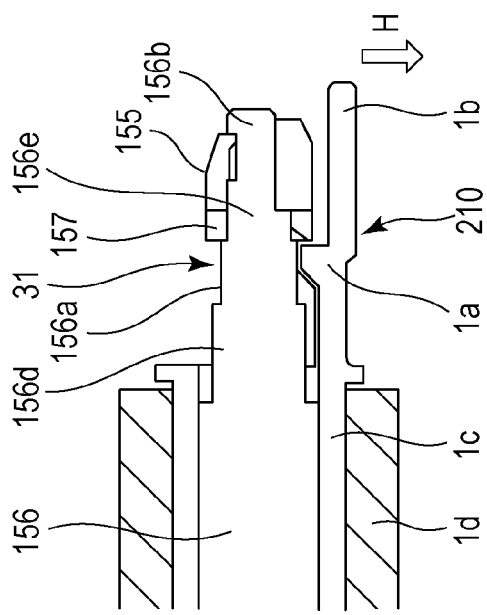

As illustrated in FIGS. 4A and 4B, the pick-up roller 1 includes a cylindrical conveying rubber portion 1d configured to come into contact with paper on an outer periphery thereof, and a core portion 1c provided inside the conveying rubber portion 1d and formed into a cylindrical shape. A protruding portion 210 protrudes from the core portion 1c in an axial direction. The protruding portion 210 includes a snap fit claw 1a as a contacting portion and an arm portion 1b for allowing an operator replacing the pick-up roller 1 to operate. The core portion 1c and the protruding portion 210 are formed of a resin molded integrally with each other. The protruding portion 210 is formed to have a thin profile so as to allow resilient deformation.

The pick-up roller shaft 156 includes a large diameter portion 156d, a small diameter portion 156a smaller in diameter than the large diameter portion 156d, and a ring mounting portion 156e provided on an end side with respect to the small diameter portion 156a. The pick-up roller shaft 156 is provided further on the end side with respect to the ring mounting portion 156e, and includes distal end portion 156b having a D-shape in cross section.

A ring member 157 is mounted on the ring mounting portion 156e. An inner diameter of the ring member 157 is larger than an outer diameter of the ring mounting portion 156e. Therefore, the ring member 157 is supported by the pick-up roller shaft 156 so as to be rotatable with respect to the pick-up roller shaft 156. An outer diameter of the ring member 157 is larger than the outer diameter of the small diameter portion 156a. A groove portion 31 is defined by the large diameter portion 156d, the small diameter portion 156a, and the ring member 157. When a fixing member 155 is mounted on a distal end portion 156b of the pick-up roller shaft 156, the ring member 157 cannot be demounted from the pick-up roller shaft 156 by means of the fixing member 155. In other words, the ring member 157 is fixed to an end of the pick-up roller shaft 156 by means of the fixing member 155, and the groove portion 31 is formed at the end of the pick-up roller shaft 156 by the fixed ring member 157, the large diameter portion 156d and the small diameter portion 156a of the pick-up roller shaft 156.

With the snap fit claw 1a of the pick-up roller 1 fitted into the groove portion 31 defined by the large diameter portion 156d, the small diameter portion 156a, and the ring member 157, the pick-up roller 1 is coupled to the pick-up roller shaft 156. In other words, the pick-up roller 1 is retained so as not to come off the end of the pick-up roller shaft 156 by the snap fit claw 1a coming into abutment with the ring member 157. In this manner, the movement of the snap fit claw 1a in the axial direction is restricted by the ring member 157 as a restricting member, the pick-up roller 1 is restricted from coming off. The movement in a direction opposite to the end of the pick-up roller shaft 156 of the pick-up roller 1 is restricted by a flange 32 (see FIG. 3) formed on the pick-up roller shaft 156.

Here, the ring member 157 with which the snap fit claw 1*a* abuts is rotatable with respect to the pick-up roller shaft 156. Therefore, when the pick-up roller 1 rotates with respect to the pick-up roller shaft 156, the following effect is achieved. In other words, in comparison with a configuration in which a locking portion against which the snap fit claw 1*a* abuts rotates integrally with the pick-up roller shaft 156, in this embodiment, probability of grazing of the snap fit claw 1*a* with the ring member 157 (locking member) is reduced. Therefore, a trouble caused by wear of the snap fit claw 1*a* after the long-term use, for example, coming off of the pick-up roller 1 due to a locking failure as a result of the wear of the snap fit claw 1*a* may be prevented.

An operation to be performed when demounting the pick-up roller 1 from the pick-up roller shaft 156 for replacement of the pick-up roller 1 will be described. When the operator operates the arm portion 1*b* of the snap fit in A direction of separating the arm portion 1*b* of the snap fit from the pick-up roller 1 in a direction indicated by an arrow H, the protruding portion 210 is resiliently deformed and the snap fit claw 1*a* is demounted from the ring member 157. In this state, the operator moves the pick-up roller 1 in the axial direction (indicated by an arrow K), so that the pick-up roller 1 is allowed to be demounted from the pick-up roller shaft 156.

In a configuration in which the locking portion against which the snap fit claw abuts is integrally formed with the pick-up roller shaft 156, preventing wear of the snap fit claw 1*a* by improving a surface nature of the locking portion with which the snap fit claw 1*a* comes into abutment is also conceivable. However, in association with an improvement in durability of the roller itself, reliable prevention of the trouble caused by wear of the snap fit claw becomes difficult only by improving the surface nature of the locking portion. In this embodiment, since the snap fit claw 1*a* is locked by the rotatable ring member 157, troubles caused by wear of the snap fit claw 1*a* is reliably prevented. In this embodiment, since the roller can be replaced only by one action, namely by operating the arm portion 1*b*, an improvement of serviceability, specifically, lowering of the labor cost is enabled.

The feed roller 2 and the retard roller 3 are different from the configuration of the pick-up roller 1 in that the snap fit claws are positioned on the inner side of the respective rollers. However, the configuration related to the retaining of the roller is the same as that of the pick-up roller 1. In other words, the snap fit claw of the feed roller 2 is locked by a ring member (locking member) which is rotatable with respect to the feed roller shaft 108. The feed roller 2 can be demounted from the shaft by pressing an arm portion 2*b* (see FIG. 3) downward to release the lock by the snap fit claw. The snap fit claw of the retard roller 3 is also locked by a ring member (locking member) which is rotatable with respect to the retard roller shaft 107. The retard roller 3 can be demounted from the retard roller shaft 107 by pressing an arm portion 3*b* (see FIG. 3) downward to release the lock by the snap fit claw.

A rotational driving force from the feed roller shaft 108 is transmitted to the feed roller 2 via a one-way clutch. Here, the pair of conveying rollers 70 conveys the sheet at a speed higher than a sheet conveyance velocity in a paper feeding action of the feed roller 2. The feed roller 2 rotates relatively with respect to the feed roller shaft 108 by being taken along the papers P being conveyed by the pair of conveying rollers 70.

A rotational driving force in a direction opposite to the direction of conveyance is transmitted from the retard roller shaft 107 to the retard roller 3 via the torque limiter 10. When one piece of papers P is fed, the retard roller 3 rotates in a direction opposite to that of the retard roller shaft 107, so that the retard roller 3 rotates with respect to the retard roller shaft 107.

When the rotating member (roller) and the shaft rotates relatively to each other, if the locking portion that locks the snap fit claw of the rotating member is integrally formed with the shaft, the snap fit claw and the locking portion are in a relationship grazing with respect to each other. Here, if a force in the axial direction does not act, less wear occurs on the snap fit claw even after a long-term use. However, a force in the axial direction is generated by uneven wear of the roller, eccentric deflection of the roller, inclination of the shaft, and the like, so that wear occurs.

In contrast, in this embodiment, the pick-up roller 1, the feed roller 2, and the retard roller 3 are locked by a ring member (locking portion) rotatable with respect to the pick-up roller 1, the feed roller 2, the retard roller 3, and the shafts 156, 107 and 108, so that wear of the snap fit claw may be prevented. Therefore, trouble of locking failure caused by wear of the snap fit claw is reduced.

Subsequently, a second embodiment will be described with reference to FIGS. 5A and 5B.

The second embodiment is provided with a bearing member 158 instead of the ring member which abuts against the snap fit claw of the first embodiment. The pick-up roller 1 will be described as in the first embodiment. The bearing member 158 provided with an inner ring portion and an outer ring portion that rotates with respect to the inner ring portion is provided on a distal end portion 156*b* of the pick-up roller shaft 156. The inner ring portion is press-fitted to the distal end portion 156*b*, and the bearing member 158 is fixed to the pick-up roller shaft 156. The outer ring portion (ring portion) of the bearing member 158 rotates relatively with respect to the pick-up roller shaft 156.

A snap fit claw 1*a* fits into a groove portion 31 defined by the large diameter portion 156*d*, the small diameter portion 156*a*, and the bearing member 158. The outer ring portion of the bearing member 158 as a restricting member abuts against the snap fit claw 1*a* of the pick-up roller 1 to retain (lock) the pick-up roller 1. The outer ring portion of the bearing member 158 rotates integrally with the snap fit claw 1*a*. Accordingly, wear of the snap fit claw 1*a* due to the long-term use is prevented, and ease of replacement of the roller is assured. In the feed roller 2 and the retard roller 3 as well, the retaining mechanism of this embodiment which locks the movement in the axial direction by using the bearing member 158 is applicable.

The description described above is given on an example of the roller that conveys paper as a rotating body. However, the invention can be applied to a gear 51 which constitutes part of the driving force transmitting device for transmitting a driving force. A mode in which the invention is applied to the coupling device configured to couple the gear shaft and the gear will be described with reference to FIGS. 6A and 6B. In FIGS. 6A and 6B, the same reference signs are assigned to the same functional components as those in the mode illustrated in FIG. 3, and detailed description will be omitted.

In FIGS. 6A and 6B, the gear 51 is supported by a gear shaft 166 which is retained at one end thereof by a body frame so as not to rotate. The gear 51 is used for the idler gear 133 arranged between the pick-up roller input gear 132 and the pick-up roller gear 131 (see FIG. 2).

The gear 51 is provided with a snap fit claw 51*a*. The snap fit claw 51*a* fits into a groove portion defined by a large diameter portion 166*d*, a small diameter portion 166*a*, and a ring member 157. The snap fit claw 51*a* is locked by the ring member 157 rotatable with respect to the gear shaft 166. A configuration in which the ring member 157 cannot be demounted from the gear shaft 166 by the fixing member 155 is the same as the mode illustrated in FIG. 4.

Locking of the ring member 157 with respect to the snap fit claw 51*a* is released by operating an arm portion 51*b*, so that the gear 51 can be removed from the gear shaft 166.

A configuration in which the bearing illustrated in FIGS. 5A and 5B is used as a device that couples the gear shaft and the gear which is demountable from the gear shaft is also applicable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-209381, filed Oct. 4, 2013, which is hereby incorporated by reference herein in its entirety.

What is claimed is:

1. A driving device comprising:
   a driving source;
   a shaft;
   a rotating member supported by the shaft, the rotating member rotated by receiving a driving force from the driving source with respect to the shaft and demountable from the shaft;
   a contacting portion provided on the rotating member; and
   a restricting member that is provided on the shaft to be rotatable with respect to the shaft and restricts a movement of the rotating member in an axial direction by contact with the contacting portion.

2. The device according to claim 1, wherein the contacting portion is deformable so the rotating member can be demounted from the shaft without being restricted by the restricting member.

3. The device according to claim 1, wherein the shaft includes a large diameter portion, and a small diameter portion provided on an end side with respect to the large diameter portion and having a diameter smaller than that of the large diameter,
   the contacting portion has a claw,
   the restricting member is arranged on an end side with respect to the small diameter portion, and
   the claw is fitted in a groove portion, the groove portion being defined by the large diameter portion, the small diameter portion, and the restricting member.

4. The device according to claim 3, further comprising a fixing member mounted at an end of the shaft and configured to prevent the restricting member from coming off the shaft.

5. The device according to claim 1, wherein the restricting member is a bearing member provided on the shaft.

6. The device according to claim 1, wherein the rotating member is a roller configured to convey a sheet.

7. The device according to claim 1, wherein the rotating member is a gear configured to transmit the driving force.

8. A sheet conveyance device comprising:
   a roller configured to convey a sheet;
   a shaft configured to support the roller to be rotatable and demountable with respect to the shaft in an axial direction;
   a contacting portion provided on the roller; and
   a restricting member that is provided on the shaft to be rotatable with respect to the shaft and restricts a movement of the roller in the axial direction by contact with the contacting portion.

9. The sheet conveyance device according to claim 8, wherein the contacting portion is deformable so the roller can be demounted from the shaft without being restricted by the restricting member.

10. The sheet conveyance device according to claim 8, wherein
    the contacting portion has a claw,
    the shaft includes a large diameter portion, and a small diameter portion provided on an end side with respect to the large diameter portion and having a diameter smaller than that of the large diameter,
    the restricting member is arranged on an end side with respect to the small diameter portion, and
    the claw is fitted in a groove portion, the groove portion being defined by the large diameter portion, the small diameter portion, and the restricting member.

11. The sheet conveyance device according to claim 10, further comprising a fixing member mounted at an end of the shaft, and configured to prevent the restricting member from coming off the shaft.

12. The sheet conveyance device according to claim 8, wherein the restricting member is a bearing member provided on the shaft.

13. A driving force transmitting device comprising:
    a gear;
    a shaft configured to support the gear to be rotatable and demountable with respect to the shaft in an axial direction;
    a contacting portion provided on the gear; and
    a restricting member that is provided on the shaft to be rotatable with respect to the shaft and restricts a movement of the gear in the axial direction by contact with the contacting portion.

14. The driving force transmitting device according to claim 13, wherein
    the contacting portion is deformable so the gear can be demounted from the shaft without being restricted by the restricting member.

15. The driving force transmitting device according to claim 13, wherein
    the contacting portion has a claw,
    the shaft includes a large diameter portion, and a small diameter portion provided on an end side with respect to the large diameter portion and having a diameter smaller than that of the large diameter,
    the restricting member is arranged on an end side with respect to the small diameter portion, and
    the claw is fitted in a groove portion, the groove portion being defined by the large diameter portion, the small diameter portion, and the restricting member.

16. The driving force transmitting device according to claim 15, further comprising a fixing member mounted at an end of the shaft, and configured to fix the restricting member so as not to come off the shaft.

17. The driving force transmitting device according to claim 13, wherein the restricting member is a bearing member provided on the shaft.

18. A sheet conveying device comprising:
a shaft having a large diameter portion, and a small diameter portion provided on an end side with respect to the large diameter portion and having a diameter smaller than that of the large diameter;
a ring member that is mounted on the shaft on an end side with respect to the small diameter portion and is rotatable with respect to the shaft;
a roller configured to be mounted on the shaft so as to be demountable; and
a claw provided on the roller to be fitted into a groove portion which is defined by the large diameter portion, the small diameter portion, and the ring member.

* * * * *